(12) United States Patent
Peng et al.

(10) Patent No.: US 7,813,394 B2
(45) Date of Patent: Oct. 12, 2010

(54) LASER WITH GAIN MEDIUM SUPPRESSING HIGHER ORDER MODES TO PROVIDE LASING OUTPUT WITH HIGH BEAM QUALITY

(75) Inventors: Xiaoyuan Peng, Portland, OR (US); Wensheng Ren, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 12/752,994

(22) Filed: Apr. 1, 2010

(65) Prior Publication Data

US 2010/0189145 A1 Jul. 29, 2010

Related U.S. Application Data

(63) Continuation of application No. 12/058,564, filed on Mar. 28, 2008, now Pat. No. 7,720,121.

(51) Int. Cl.
*H01S 3/14* (2006.01)
(52) U.S. Cl. .......................................... 372/39; 372/40
(58) Field of Classification Search ................. 372/39, 372/6, 22; 385/126, 31; 359/333
See application file for complete search history.

(56) References Cited

U.S. PATENT DOCUMENTS

| | | | |
|---|---|---|---|
| 5,341,389 A | 8/1994 | Payne et al. | |
| 6,625,193 B2 | 9/2003 | Vetrovec | |
| 7,203,214 B2 | 4/2007 | Butterworth | |
| 7,286,587 B2 | 10/2007 | Budni | |
| 7,440,176 B2 | 10/2008 | Fidric | |
| 7,522,651 B2 | 4/2009 | Luo et al. | |
| 7,567,608 B2 | 7/2009 | Chung | |
| 2007/0236781 A1* | 10/2007 | Fidric | 359/341.3 |
| 2008/0013586 A1* | 1/2008 | Spence et al. | 372/70 |
| 2008/0187019 A1* | 8/2008 | Chung | 372/50.11 |

OTHER PUBLICATIONS

Peng, Xiaoyuan; Xu, Lei; and Asundi, Anand, "Power Scaling of Diode-Pumped Nd:YVO$_4$ Lasers," *IEEE Journal of Quantum Electronics*, vol. 38, No. 9, Sep. 2002, pp. 1291-1299.

Schlatter, A.; Krainer, L.; Golling, M.; Paschotta, R., "Passively Mode-Locked 914-nm Nd:YVO$_4$ Laser," *Optics Letters*, vol. 30, No. 1; Jan. 1, 2005; pp. 44-46.

McDonagh, Louis; Wallenstein, Richard; Knappe, Ralf and Nebel, Achim, "High-Efficiency 60 W TEM$_{00}$ Nd:YVO$_4$ Oscillator Pumped at 888 nm," *Optics Letters*, vol. 31, No. 22; Nov. 15, 2006: pp. 3297-3299.

\* cited by examiner

*Primary Examiner*—Minsun Harvey
*Assistant Examiner*—Tuan N. Nguyen
(74) *Attorney, Agent, or Firm*—Stoel Rives LLP

(57) ABSTRACT

High-power, diode-pumped solid state (DPSS) pulsed lasers are preferred for applications such as micromachining, via drilling of integrated circuits, and ultraviolet (UV) conversion. Nd:YVO$_4$ (vanadate) lasers are good candidates for high power applications because they feature a high energy absorption coefficient over a wide bandwidth of pumping wavelengths. However, vanadate has poor thermo-mechanical properties, in that the material is stiff and fractures easily when thermally stressed. By optimizing laser parameters and selecting pumping wavelengths and doping a concentration of the gain medium to control the absorption coefficient less than 2 cm$^{-1}$ such as the pumping wavelength between about 910 nm and about 920 nm, a doped vanadate laser may be enhanced to produce as much as 100 W of output power without fracturing the crystal material, while delivering a 40% reduction in thermal lensing.

18 Claims, 12 Drawing Sheets

«LASER WITH GAIN MEDIUM SUPPRESSING HIGHER ORDER MODES TO PROVIDE LASING OUTPUT WITH HIGH BEAM QUALITY»

RELATED APPLICATION

This is a continuation of U.S. patent application Ser. No. 12/058,564, filed Mar. 28, 2008.

COPYRIGHT NOTICE

© 2010 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This disclosure pertains to solid state laser devices used in high power applications.

BACKGROUND INFORMATION

A laser amplifies light by concentrating an external source of energy into light waves of a particular wavelength and direction so that resulting light waves are spatially and temporally aligned, or in phase. A laser medium may be a gas, a liquid, or a solid state material such as a crystal. A crystal laser medium may be doped with atoms of another material to alter the properties of the laser medium.

As is well known to those skilled in the art, basic operating principles of a laser are understood to be as follows: when a laser medium is energized, electrons within atoms comprising the laser medium are temporarily elevated to a higher atomic energy level, a process called pumping absorption. When high-energy electrons return to a lower energy state, the atom emits light at a wavelength determined by the separation between the two energy levels. This process is called stimulated or spontaneous emission, and visible light emitted during the emission process is referred to as fluorescence. To achieve amplification at a particular wavelength, the number of stimulated emission events must exceed the number of stimulated absorption events, a condition called a population inversion that requires maintaining more electrons at the upper energy level than at the lower level. This population inversion is achieved by "pumping" the laser with an external source of energy, such as an electric current or another laser beam. By containing a lasing medium in a box, or cavity, with light-reflective interior surfaces, light waves produced by stimulated emission resonate within the cavity and reinforce one another to form a coherent, collimated beam. A portion of the coherent laser beam thus produced is permitted to escape through one end of the cavity. A pulsed laser beam may be generated by periodically interrupting a continuous beam. Typical pulse repetition frequencies exceed 100,000 pulses per second, or 100 kHz.

Laser pumping efficiency is expressed by a "quantum defect" level, defined as the percentage of pumping energy lost. Excess energy resides in the laser medium as heat. The quantum defect percent is given by $$q = (1 - \omega_s/\omega_p) \cdot 100,$$

in which $\omega_s$ is a frequency associated with the laser energy transition and $\omega_p$ is the pumping light frequency. Thus, a low quantum defect is desirable. In the case of a lasing material pumped by an intense light source, excited state absorption (ESA) reduces pumping efficiency. A factor $\gamma = [1 + (\delta v/\Delta v)^2]^{-1}$ is used to measure overlap between emission and absorption lines, in which $\delta v$ is the frequency difference between the emitting transition and the absorbing transition, and $\Delta v$ is the full line-width at half intensity of the pumping diode spectrum. A small value of $\gamma$ corresponds to a low probability of an ESA transition and a high efficiency pumping scheme with respect to ESA.

High-power, diode-pumped solid state (DPSS) pulsed lasers, with power levels on the order of tens of Watts, are preferred for applications such as micromachining, via drilling of integrated circuits, and ultraviolet (UV) conversion. Neodymium:Yttrium Vanadate (Nd:YVO$_4$) and Neodymium:Gadolinium Vanadate Nd:GdVO$_4$ lasers, made with Nd$^{3+}$-doped Vanadium Oxide (VO$_4$) crystals are good candidates for high power applications because they feature a high energy absorption coefficient over a wide bandwidth of pumping wavelengths. However, vanadate has poor thermomechanical properties, compared with other crystal candidates (e.g., Neodymium:Yttrium Aluminum Garnet, or Nd:YAG) in that the material is stiff and fractures easily when thermally stressed. Vanadate fractures under 53 MPa of pressure, while Nd:YAG crystals used in conventional lasers can withstand pressures as high as 138 MPa. Thus, Nd:YAG allows for a correspondingly larger maximum pump power than does vanadate.

In general, power absorbed by a lasing medium decreases exponentially from the point of entry, according to $P = P_o(1 - e^{-\alpha L})$, where $P_o$ is applied pump power, $\alpha$ is the absorption coefficient, and L is the length of the crystal rod. If pump power is absorbed preferentially along one axis of a crystal lattice, the absorption coefficient in the direction of that axis is larger. The high power pumping produces a high temperature gradient and associated tensile stress, which may cause asymmetric "thermal lensing" effects or crystal fracture, especially serious for asymmetric absorptions. A symmetric absorption coefficient indicates that pump energy is absorbed equally in all directions, which can expend the heat along the gain medium and in turn reduce excessive thermal stress in the crystal. The inherent structure of the Nd:YVO$_4$ crystal unit cell, having a dimension along the optic axis c=6.2 Å that differs from equivalent dimensions perpendicular to the optic axis, a=b=7.1 Å, results in asymmetric absorption.

Thermal lensing relates to a generally undesirable phenomenon in high power solid state lasers in which heat from excess energy absorption raises the material temperature and distorts the index of refraction of the laser crystal. This distortion results in an effective "lens," in which the focal length varies inversely with absorbed pump power. Excessive thermal lensing is detrimental to solid state laser performance because of beam distortion and reduced laser conversion efficiency. Proper control of thermal lensing in the lasing material (e.g., by lowering the quantum defect level) is therefore a critical factor in high power laser engineering.

Complications such as thermal lensing have thus far limited the power output of vanadate DPSS lasers in TEM$_{00}$ mode to less than 30 W. Limitations caused by thermal lensing and thermal fracture are described in Peng, Xiaoyuan; Xu, Lei; and Asundi, Anand; Power Scaling of Diode-Pumped Nd:YVO$_4$ Lasers, *IEEE Journal of Quantum Electronics*, Vol. 38, No. 9, 1291-99, September 2002.

Factors influencing inhomogeneous absorption, thermal lensing, and fluorescence lifetimes include doping concentration and physical dimensions of the laser crystal, as well as pumping wavelength and polarization. A typical pumping wavelength used with vanadate crystals is 808 nm, and typical doping concentrations are 0.2% at.-0.5% at, while values below 0.1% at. are difficult to achieve with the degree of control afforded by current manufacturing processes. Typical crystal rod lengths range from 7 mm-15 mm.

Vanadate crystal is an anisotropic material, in which the pump energy absorption, and therefore the laser gain, is polarization-dependent, absorbing some polarized waves more readily than others. A change in the polarization state of the pump laser beam, in response to temperature fluctuations (thermal effects), or random shifts in the polarization direction, may therefore contribute further to inhomogeneous absorption. It may be advantageous to force the pump laser beam to be either polarized in a certain direction or de-polarized to control this effect.

A 40% reduction in thermal lensing effects is reported by Dudley et al., (CLEO 2002 Proceedings) by pumping at 880 nm directly into the upper energy level of the laser transition, rather than at the traditional 808 nm wavelength. This reduction in thermal lensing effects is thought to result from a decrease in the quantum defect level from 24% to 17%, rather than from improved absorption symmetry, because the directional components of the absorption coefficient still differ by a factor of three. However, the absorption bandwidth that a pump delivers at 880 nm is only 2.5 nm compared to commercial products that offer a 4 nm bandwidth.

McDonagh et al., Optics Letters, Vol. 31, No. 22, Nov. 15, 2006 published results for a high-power Nd:YVO$_4$ laser with 0.5% at. Nd$^{3+}$ doping, pumped at 888 nm. With reference to FIG. 1, lasing wavelengths for Nd:YVO$_4$ normally include 914.5 nm, 1064 nm, and 1342 nm. As published by A. Schlatter, et al., Optics Letters, Vol. 30, No. 1, Jan. 1, 2005, when operating Nd:YVO$_4$ for emission at 914.5 nm, a neodymium ion behaves as a quasi-three-level system. The low laser energy level Z5 is only 433 cm$^{-1}$ above the ground state, a condition that results in a high lower-state population of 5% at room temperature. Therefore, Schlatter concludes that there is difficulty in achieving Nd:YVO$_4$ lasing at 914.5 nm because a very bright pumping light source is needed to overcome the high threshold caused by a high population in the state of 433 cm$^{-1}$.

FIGS. 2, 3, 4, and 5 illustrate certain limitations of vanadate crystals. A primary limitation is maximum pump power, which is the amount of pump energy that may be delivered to a crystal before it fractures. FIG. 2 is a plot comparing calculated maximum pump power levels 100 and measured maximum pump power levels 102 for a doped vanadate crystal, 3 mm×3 mm×5 mm, with a pump beam radius of 0.4 mm. Dependence of fracture-limited pump power on crystal properties is well established. In this case, crystal dimensions, pump beam radius, pump wavelength, and laser-active ion doping concentration determine the power operating range of the laser device. FIG. 2 compares calculated results with three experimental data points 104, indicating the pump power at which vanadate crystals actually fractured for various doping concentrations. The calculation used to predict the curve shown in FIG. 2 is a three-dimensional finite element model that simulates thermal effects of pumping a doped crystal by solving Fourier's heat conduction equation. FIG. 2 shows that low doping concentrations are desirable to prevent fracture, with 0.3% at. doping concentration 106 being optimal, allowing a maximum pump power of 37 W. FIG. 3 shows that, for an applied pump power of 30 W, just under the maximum from FIG. 2, the predicted output power 108 achieved by pumping a vanadate laser with a 0.5% doping concentration is optimized at 9 W. Results in FIGS. 2 and 3 were obtained using a diode laser pump at the conventional pumping wavelength of 808 nm.

FIGS. 4 and 5 show spatial distributions of pump power along the length of a 15 mm vanadate crystal rod that serves as a lasing gain medium. Solid curve 110 and dotted curve 112 trace, at various points along the length of the rod (a-cut), respectively, average power absorbed for polarization in the a-axis direction and average power absorbed for polarization in the c-axis of the crystal rod. An ideal crystal rod exhibits symmetric power absorption, in which both the solid and dotted curves are flat lines that coincide along the full length of the rod. The vanadate crystal rod has asymmetric power absorption with, on average, more power absorbed for polarization in the c-axis direction. Furthermore, when pump power is applied to the ends of a lasing gain medium, more power is absorbed close to the ends, while less power reaches the center, a condition referred to as "end-bulging" 120. This applies to both c- and a-axes; however, more extreme end-bulging 122 occurs in the c-direction. A reduction in end-bulging 124 and a reduction in asymmetry 126 both occur when the doping level increases from 0.3% at. (FIG. 5) to 0.5% at. (FIG. 4). The integrated temperature gradient on the cross section of the lasing crystal is greater in the c-axis direction than in the a-axis direction.

SUMMARY OF THE DISCLOSURE

By optimizing operating parameters, an ion-doped vanadate laser may be enhanced to produce 100 W or more of output power in TEM$_{00}$ mode at, for example, 1064 nm, without crystal fracture, while reducing thermal lensing by 40%. It has been determined that the degree of energy absorption along orthogonal crystal lattice axes, described by a- and c-absorption coefficients, may be made symmetric by setting the pump wavelength to 914.5 nm, and that this symmetry is maintained over a range of doping concentrations. A 40% reduction in thermal lensing previously discovered at 880 nm and 888 nm persists at 914.5 nm, while the quantum defect level is reduced at 914.5 nm. The following table compares quantum defect levels for 1064 nm Neodymium lasers at different pumping wavelengths:

| Pump Wavelength | Quantum Defect |
| --- | --- |
| 808 nm | 0.2406 |
| 880 nm | 0.1729 |
| 888 nm | 0.1654 |
| 914.5 nm | 0.1400 |

Furthermore, values of γ for pumping at 914.5 nm and 888 nm wavelengths are much smaller compared with the traditional 808 nm pumping. Thus, conversion efficiency is improved due to a high quantum efficiency and a reduced ESA transition probability. The following table lists calculated values of γ for a line-width of 3 nm based on spectroscopic data from "Laser Crystals" by Alexander A. Kaminskii.

| Pump Wavelength | ESA Transition | γ |
| --- | --- | --- |
| 808 nm | $^4F_{3/2} \rightarrow {}^2D_{5/2}$ | 0.1715 |
| 880 nm | $^4F_{3/2} \rightarrow {}^2P_{1/2}$ | 0.0153 |
| 888 nm | $^4F_{3/2} \rightarrow {}^2P_{1/2}$ | 0.0084 |
| 914.5 nm | $^4F_{3/2} \rightarrow {}^2D_{3/2}$ | 0.0098 |

Simultaneously, higher pump power and less thermal lensing may be achieved, enabling a pulse repetition frequency (PRF) up to as high as 1 MHz, while preserving a pumping bandwidth of 4 nm. Boosting the vanadate crystal doping concentration from below 0.5% at, to 2.0% at. and using a longer crystal rod improves pump power absorption and gain. Pump power at the pump wavelengths of 914.5 nm and 888 nm is generally absorbed more evenly along the length of a long (e.g., 60 mm) crystal rod with a low absorption coefficient than pump power at the pump wavelengths of 808 nm and 880 nm in shorter crystal rods with a high absorption coefficient. The fluorescence lifetime of vanadate pumped at 808 nm also decreases linearly with increased doping concentration, achieving 50 µs-100 µs at a 1.0% at.-2.0% at. doping level.

Additional aspects and advantages will be apparent from the following detailed description of preferred embodiments, which proceeds with reference to the accompanying drawings.

DETAILED DESCRIPTION OF PREFERRED EMBODIMENTS

FIGS. 6-12 demonstrate relevant aspects of pumping vanadate crystals at various wavelengths. A significant difference between the two absorption curves in each drawing indicates asymmetric absorption, i.e., more energy is absorbed for pumping light polarized in the c-axis direction than in the a-axis direction. The broad pumping wavelength spectrum (800 nm-920 nm) shown in FIG. 12 indicates that absorption symmetry improves dramatically above about 880 nm (i.e., at 888 nm and 914.5 nm). At the 888 nm and 914.5 nm wavelengths, spectral profiles 219a and 219c and spectral profiles 220a and 220c for the respective orthogonal a- and c-crystal lattice axes nearly coincide, although the total absorption is less than 5%.

Figure 6:
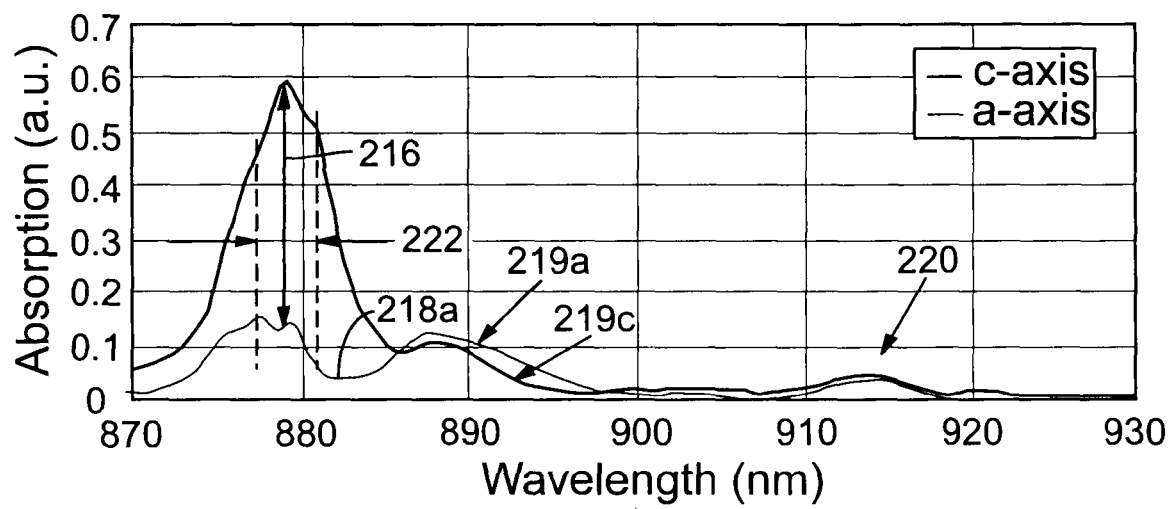
FIG. 6 is a graph of the absorption spectrum of an Nd:YVO$_4$ crystal with 0.3% at. doping concentration measured with a Perkin Elmer Lambda 900 spectrometer.
Figure 7:
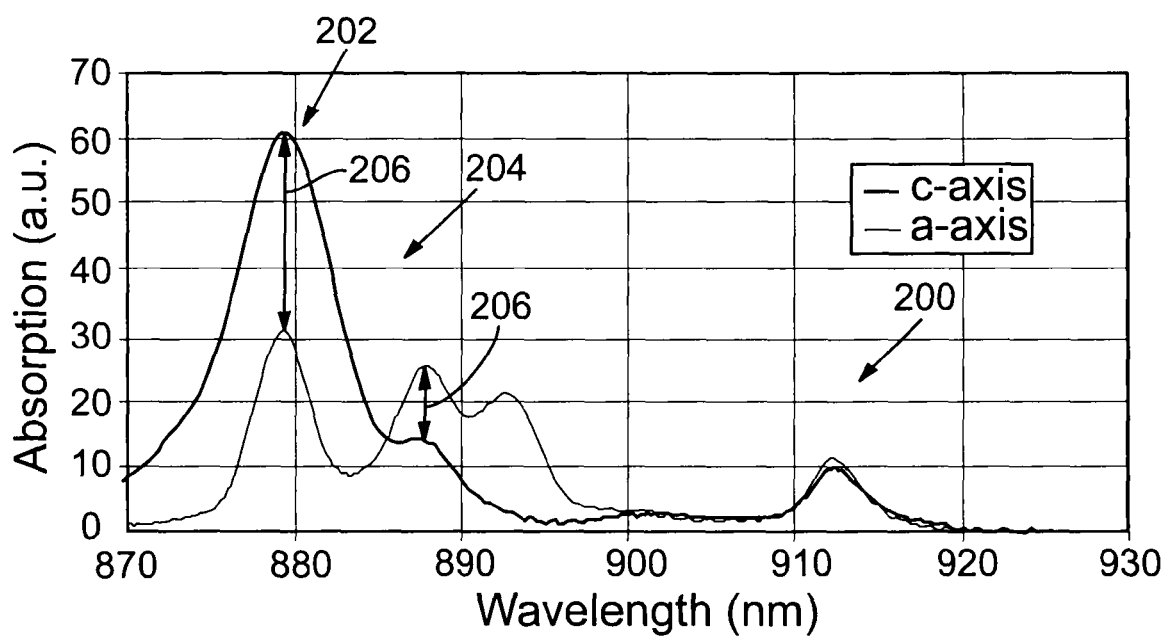
FIG. 7 is a graph of the absorption spectrum of an alternative Nd:GdVO$_4$ crystal with 0.3% at. doping concentration measured with a Perkin Elmer Lambda 900 spectrometer.
Figure 8:
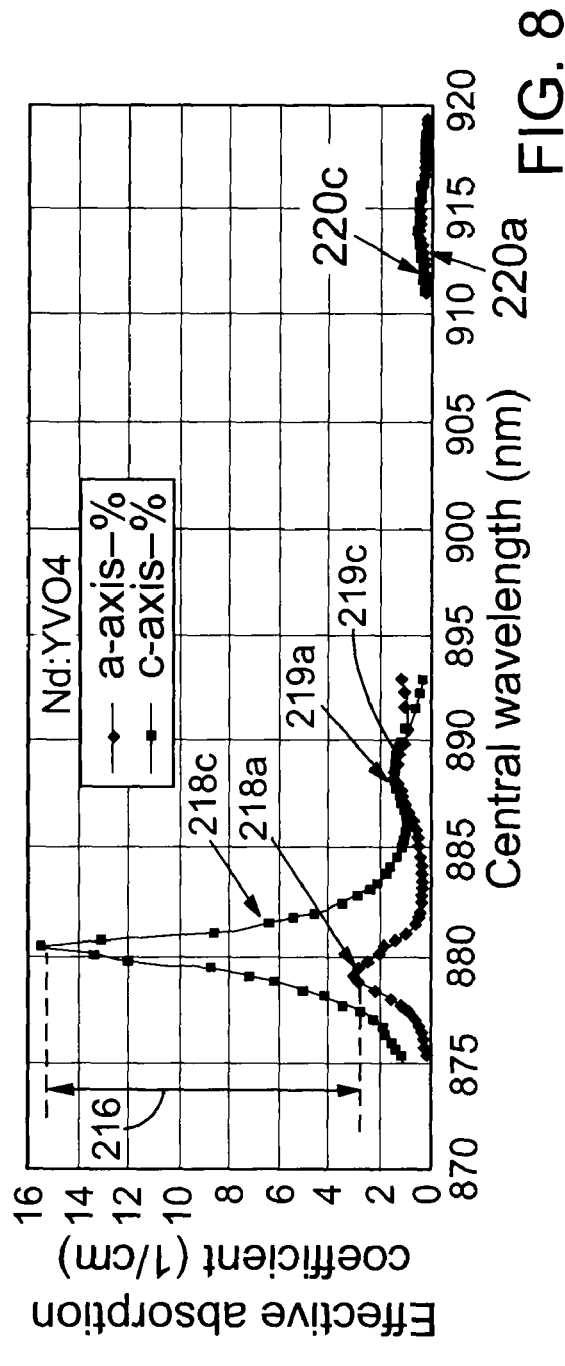
FIG. 8 is a graph of the effective absorption coefficient for an Nd:YVO$_4$ crystal with a 1% at. doping concentration, along two orthogonal crystal lattice axes, a and c, as a function of pump wavelength, derived from measured data.
Figure 9:
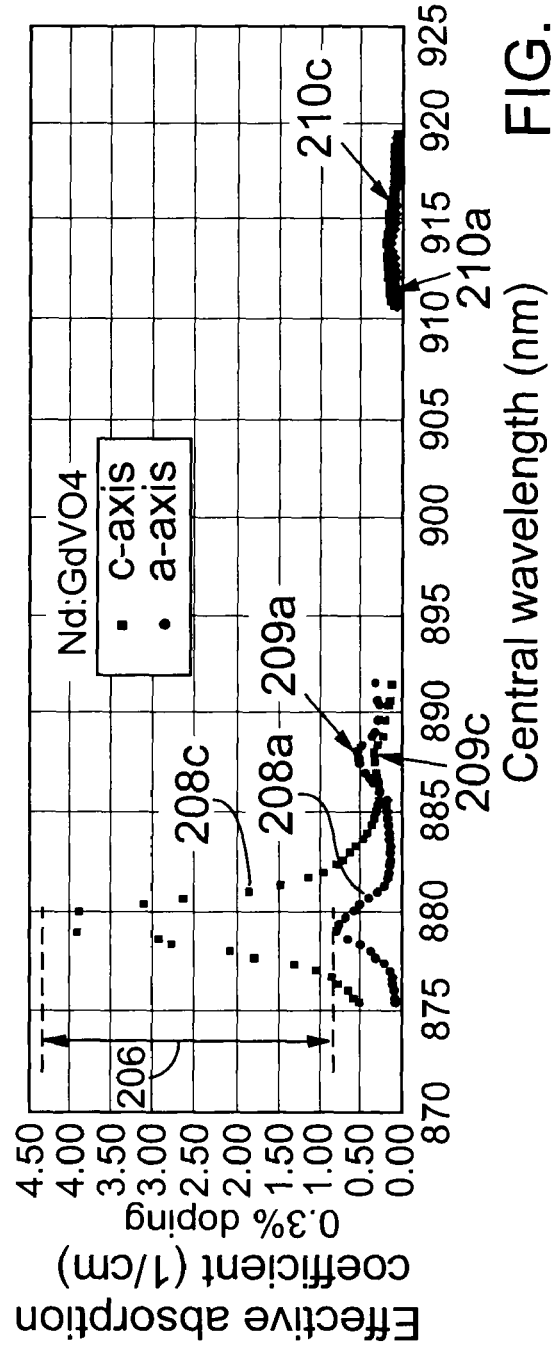
FIG. 9 is a graph of the effective absorption coefficient for an alternative preferred Nd:GdVO$_4$ crystal with a 0.3% at. doping concentration, along two orthogonal crystal lattice axes, a and c, as a function of pump wavelength, derived from measured data.

Absorption spectra for two embodiments, Nd:YVO$_4$ and Nd:GdVO$_4$ crystals, pumped at 914.5 nm, represent results of two different measurement methods. With reference to FIGS. 6 and 7, the first method is a direct measurement of absorption spectra. The data in FIG. 6 represent a 0.3% at.-doped Nd:YVO$_4$ crystal, and the data in FIG. 7 represent a 0.3% at.-doped Nd:GdVO$_4$ crystal, each measured with a Perkin Elmer Lambda 900 spectrometer, over the wavelength range 870 nm-930 nm. With particular reference to FIG. 7, a disparity 206 in absorption between the c-axis and a-axis curves decreases with increasing wavelength so that at 914.5 nm, the two curves are coincident, indicating that absorption at 914.5 nm is axially symmetric. This axial absorption symmetry represents a significant advantage of pumping at 914.5 nm.

Figure 10:
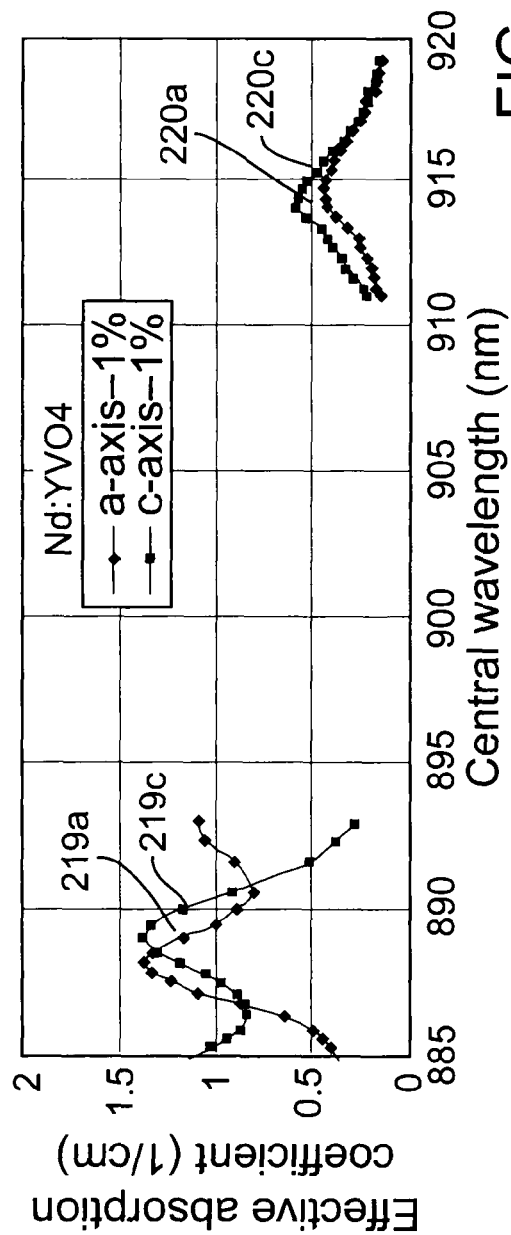
FIG. 10 is a version of the graph of FIG. 8, showing with an expanded scale effective absorption coefficients for wavelengths ranging between 885 nm and 920 nm.
Figure 11:
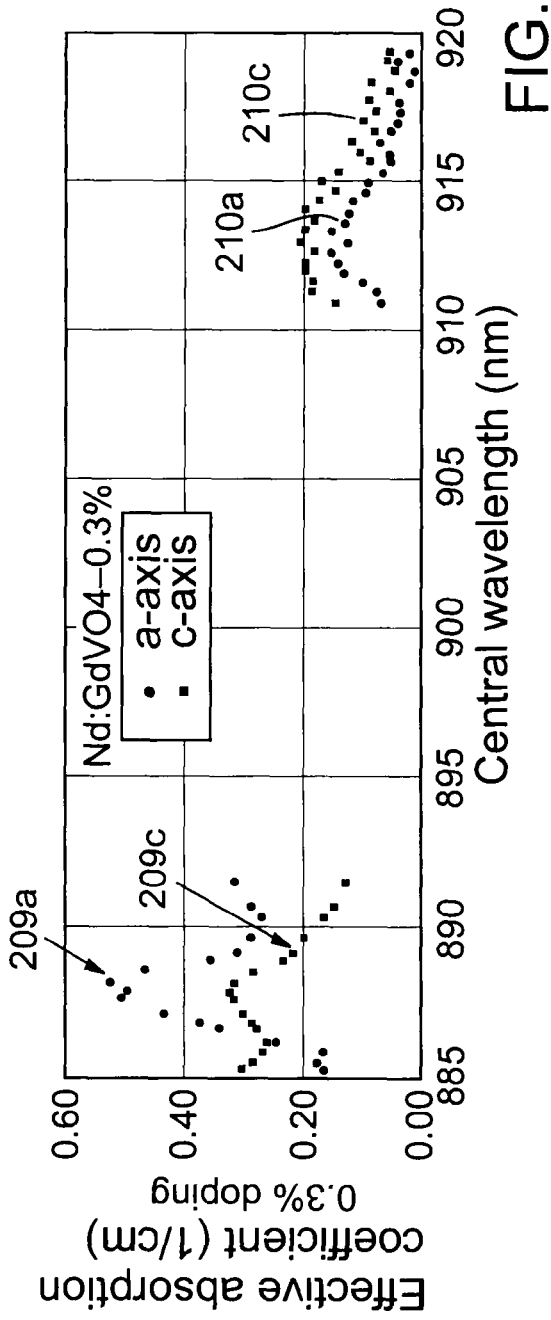
FIG. 11 is a version of the graph of FIG. 9, showing with an expanded scale effective absorption coefficients for wavelengths ranging between 885 nm and 920 nm.

The second method of determining absorption spectra entails changing the laser diode temperature, which shifts the emission wavelength. Once the emission wavelength is known, output and input power levels may be measured to determine the effective absorption coefficient, which is shown in FIGS. 8-12. Effective absorption spectra obtained using this method show that Nd:GdVO$_4$ and Nd:YVO$_4$ exhibit corresponding strong spectral profile peaks 208a, 208c and 218a, 218c at 880 nm; relatively weak spectral profile peaks 209a, 209c and 219a, 219c at 888 nm; and relatively weak spectral profile peaks 210a, 210c and 220a, 220c at 914.5 nm. Absorption coefficients in the range 0-2 cm$^{-1}$ as shown in the scaled plots in FIGS. 10 and 11 show magnified versions of prominent local spectral profile peaks 209a, 209c and 219a, 219c at 888 nm and 210a, 210c and 220a, 220c at 914.5 nm for Nd:GdVO$_4$ and Nd:YVO$_4$ having doping concentrations of 0.3% at. and 1% at., respectively.

Figure 12:
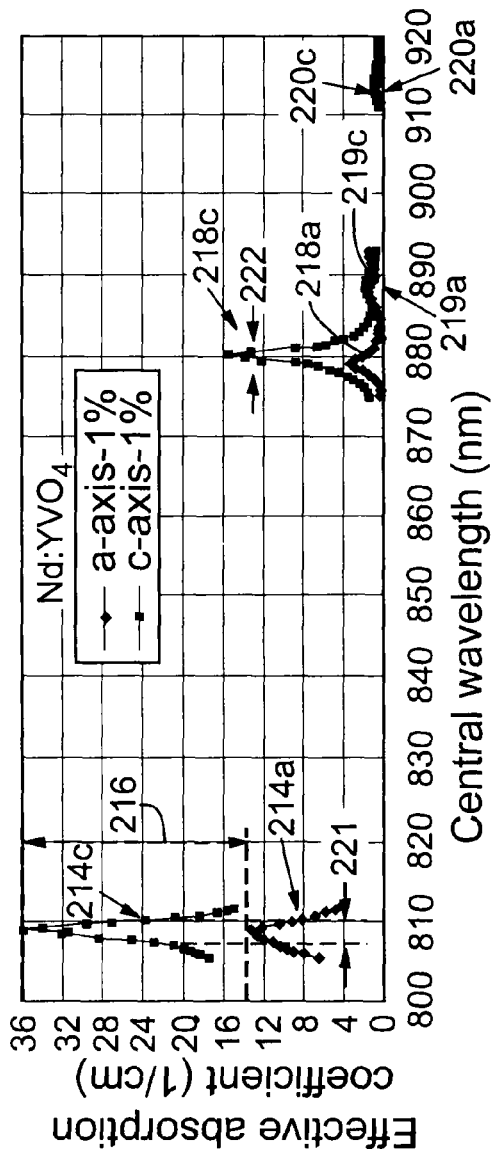
FIG. 12 is an expanded version of the graph of FIG. 8, showing with a compressed scale effective absorption coefficients for pump wavelengths ranging between 800 nm and 920 nm.
Figure 13:
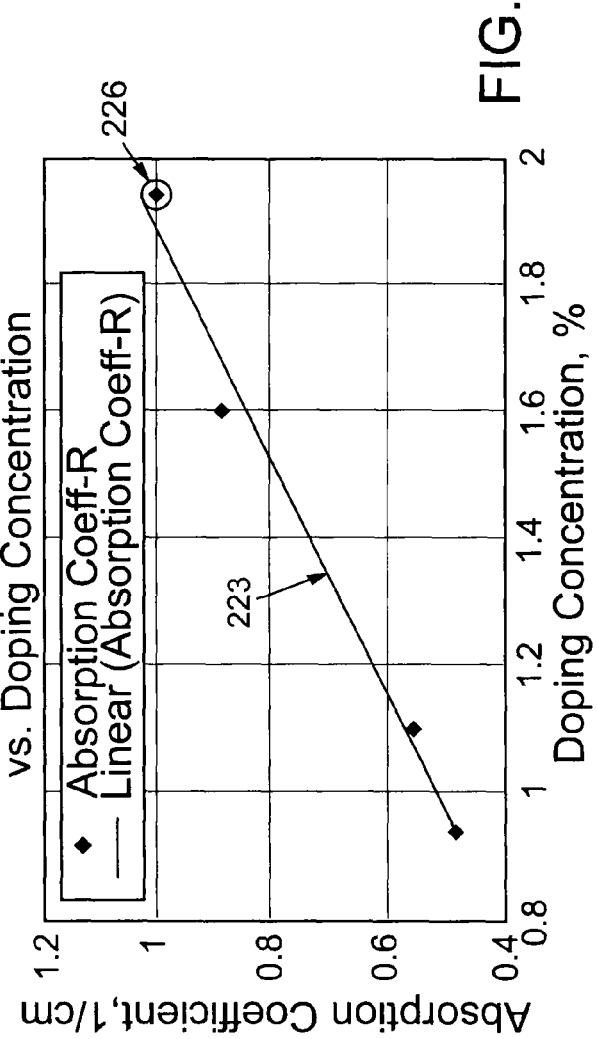
FIG. 13 is a plot showing the linear relationship of the absorption coefficient of a 914.5 nm-pumped Nd:YVO$_4$ crystal as a function of doping density.

FIG. 12 shows a more complete spectrum of effective absorption coefficients covering the entire range of pumping wavelengths of interest, 800 nm to 920 nm. The strongest peaks of spectral profiles 214a and 214c occur in vanadate at 808 nm, but the absorption is highly asymmetric, as indicated by the disparity 216 between absorption coefficients 214a and 214c, and thus requires a fairly low doping concentration for high-power applications. The same prescription exists at a pump wavelength of 880 nm. On the other hand, absorption coefficients 218a, 220a and 218c, 220c along the respective a- and c-crystal lattice axes are fairly well-matched at 888 nm and at 914.5 nm, although the maximum value of the absorption coefficient at 914.5 nm is only about one-half the maximum value at 888 nm. Symmetry at the highest pumping wavelengths allows neodymium ion-doped vanadate crystals to have a higher doping concentration. FIG. 13 shows a straight line 223 approximation representing measured absorption coefficients at 914.5 nm as a function of doping concentrations, which doping concentrations range from 0.8% at. to 2.0% at. with a maximum coefficient 226, 1.0 cm$^{-1}$, occurring at a 2.0% at. doping concentration.

Figure 2:
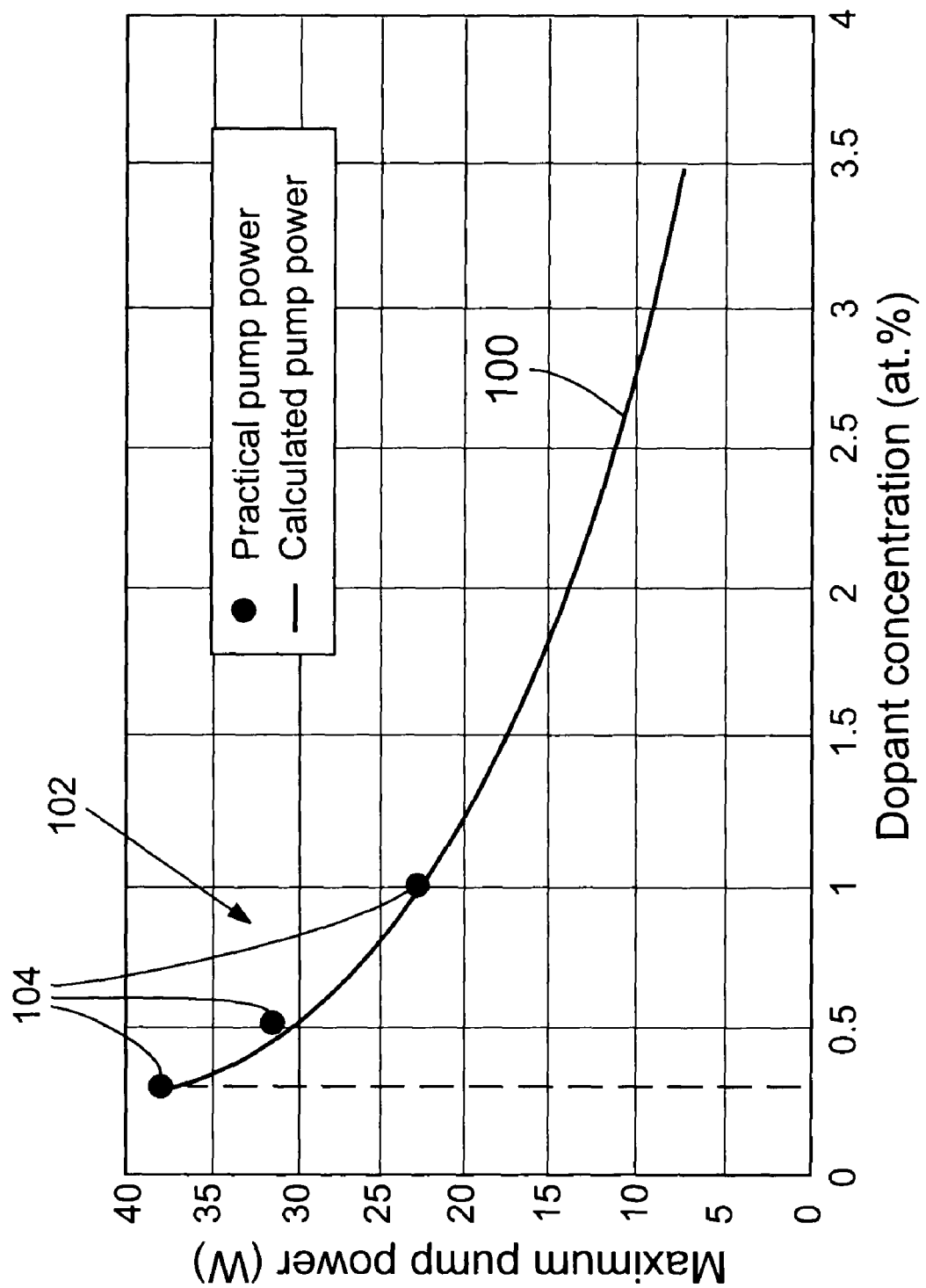
FIG. 2 is a graph of the dependence of maximum pump power on doping concentration for a prior art laser pumped at 808 nm.
Figure 3:
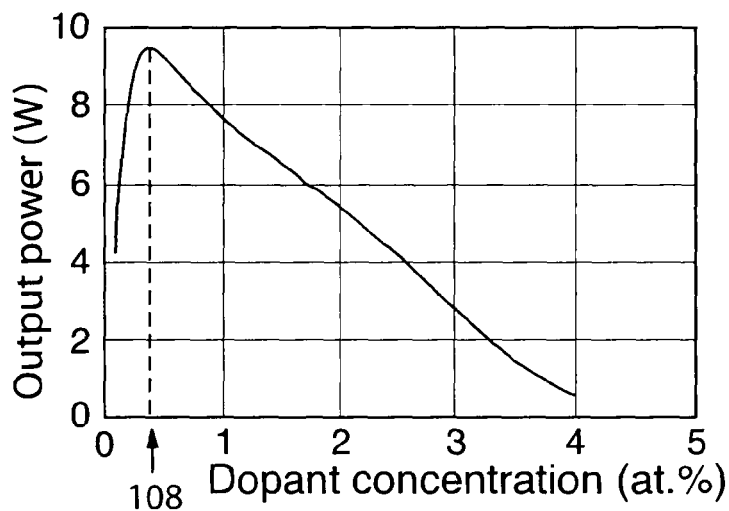
FIG. 3 is a graph of output power as a function of doping concentration for a prior art laser pumped at 808 nm, indicating an optimal value is achieved at 0.5% at. doping concentration.
Figure 4:
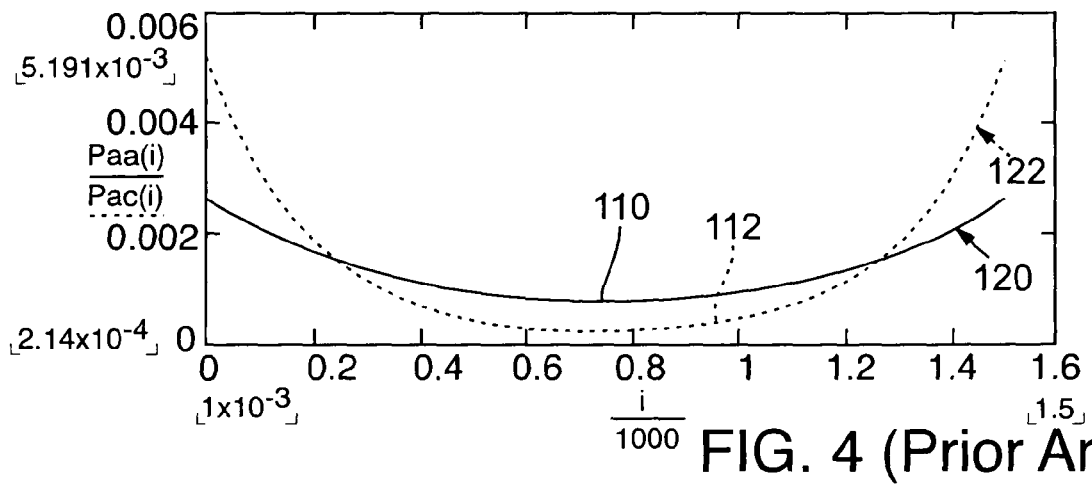
FIG. 4 is a graph of power absorption in a prior art 15 mm vanadate laser crystal, along two orthogonal crystal lattice axes, a and c, with 0.5% at. doping concentration.
Figure 5:
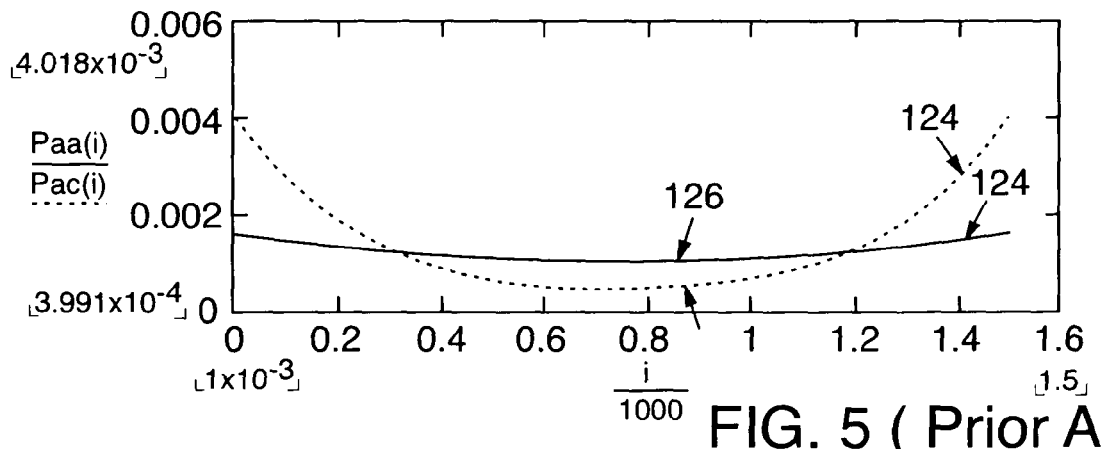
FIG. 5 is a graph of power absorption in a prior art 15 mm vanadate laser crystal, along two orthogonal crystal lattice axes, a and c, with 0.3% at. doping concentration.

Because of a low quantum defect level at 914.5 nm, thermal effects are minimized with 914.5 nm pumping. As a result, less heat is generated in the laser crystal, reducing thermal lensing and tensile stress. In addition, because power absorption is isotropic, and because the relatively low absorption of the 914.5 nm photon allows pumping light to travel farther in the laser crystal, energy is distributed more evenly along the entire laser rod, which in turn results in less temperature gradient that causes thermal stress, as is the case for vanadate crystals pumped at lower wavelengths. Thus, the vanadate crystal tolerates heating much better when pumped at 914.5 nm. As a result, a vanadate crystal can handle more pumping power, up to 100 W, which is almost impossible to achieve for 808 nm and 880 nm pumping, as indicated in FIG. 2 for 808 nm.

Figure 1:
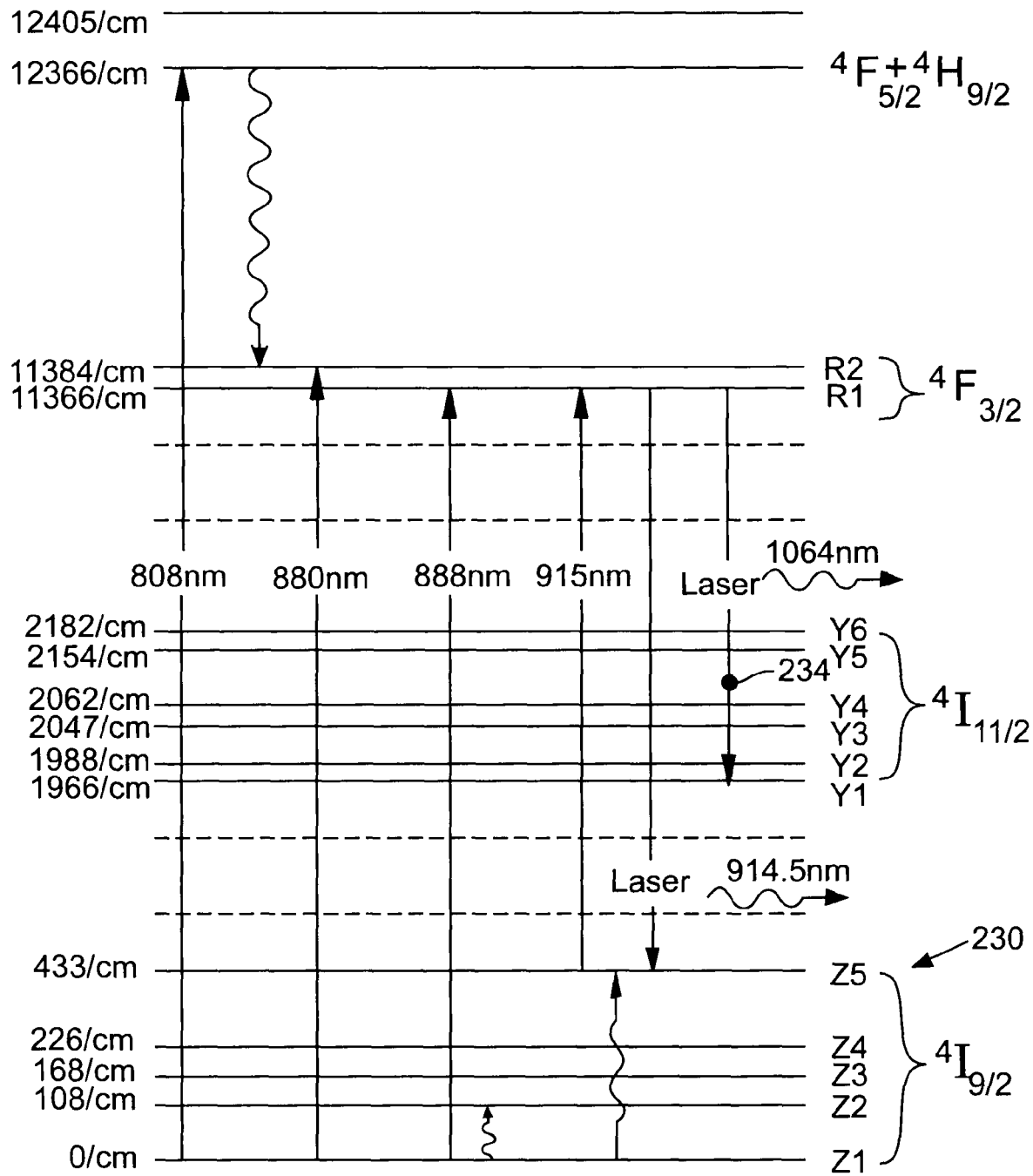
FIG. 1 is a theoretical energy diagram of a prior art Nd:YVO$_4$ crystal laser.
Figure 14:
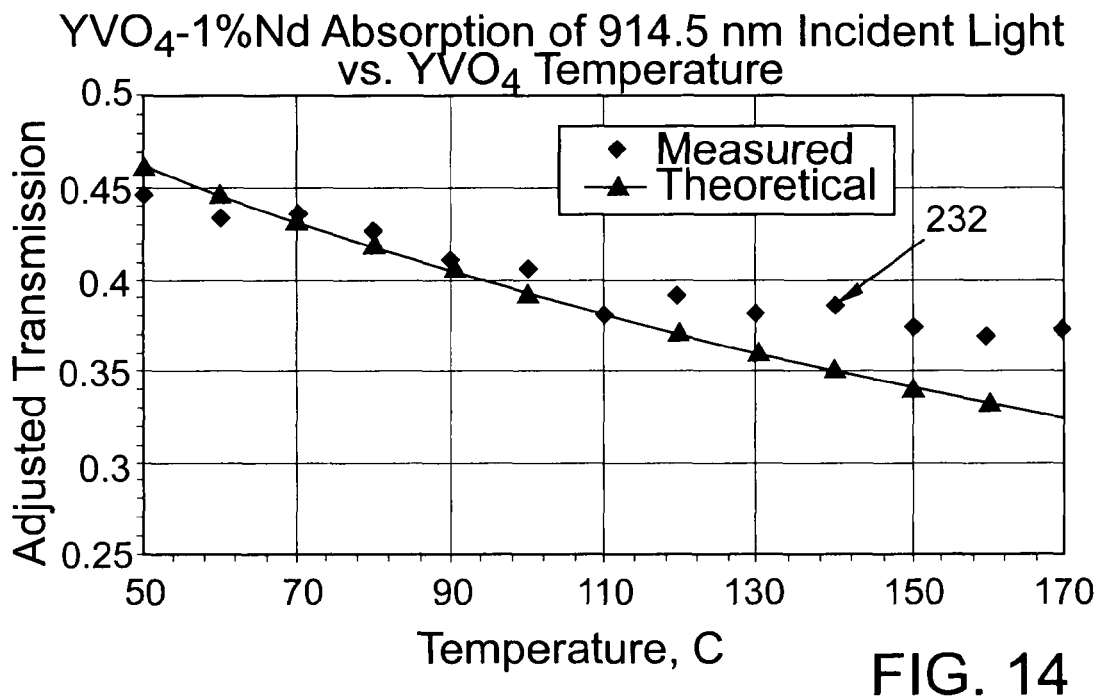
FIG. 14 is a plot comparing theoretical and measured temperature dependences of 914.5 nm light absorption in a Nd:YVO$_4$ crystal with a 1% at. doping concentration.

One reason why vanadate absorbs energy easily at 880 nm and 888 nm is that there exist in states Z1 and Z2 230 than in state Z5 more atoms that are available to absorb pumping energy and jump to higher excited energy states $^4F_{3/2}$, as diagrammed in FIG. 1. Atomic populations at equilibrium at room temperature for the ground state (Z1), the second lowest-state (Z2, 108 cm$^{-1}$), and highest lower state (Z5, 433 cm$^{-1}$) are 40%, 24%, and 5%, respectively. In general, population at an energy state varies with temperature according to Boltzmann's principle: when a collection of atoms is at thermal equilibrium, T, the ratio of atomic populations (N1 and N2) at any two energy levels E1 and E2 is given by $$\frac{N2}{N1} = \exp\left(-\frac{E2-E1}{kT}\right),$$

where k is Boltzmann's constant. As temperature increases from room temperature (24° C.) to 100° C., the exponential decrease in the number of atoms in excited states becomes less pronounced, so more atoms remain in higher energy states. For instance, the atomic population at energy level Z5 increases from 5% to 6.7%, and the absorption coefficient increases commensurately. Theoretical calculations agree well with the experimental results, as shown in FIG. 14. The measured decrease 232 in light transmission at higher temperatures, 50° C. to 170° C., indicates more light is absorbed by the crystal as it rises in temperature. Thus, a vanadate crystal pumped at 914.5 nm actually benefits from the temperature rise because the overall pump power absorption increases.

In the case of an end-pumping configuration, pump energy is concentrated in the central region of the lasing medium to overlap with laser modes. End pumping energy is highly divergent, so a pumping laser beam spot and the cross-sectional area of the lasing medium are preferably closely matched to efficiently produce a waveguide effect along the length of the lasing medium. The waveguide effect enhances beam quality and efficiency because higher order modes outside the waveguide have no gain. Referring again to the energy level diagram of FIG. 1, after stimulated emission 234 occurs from upper energy level R1 to lower energy level Y1, atoms in state Y1 decay rapidly to the nearest lower level, Z5, via multi-phonon relaxation. During laser actions, the atomic population at level Z5 thus dramatically increases above its thermal equilibrium value, which again results in increased absorption at 914.5 nm.

Figure 15:
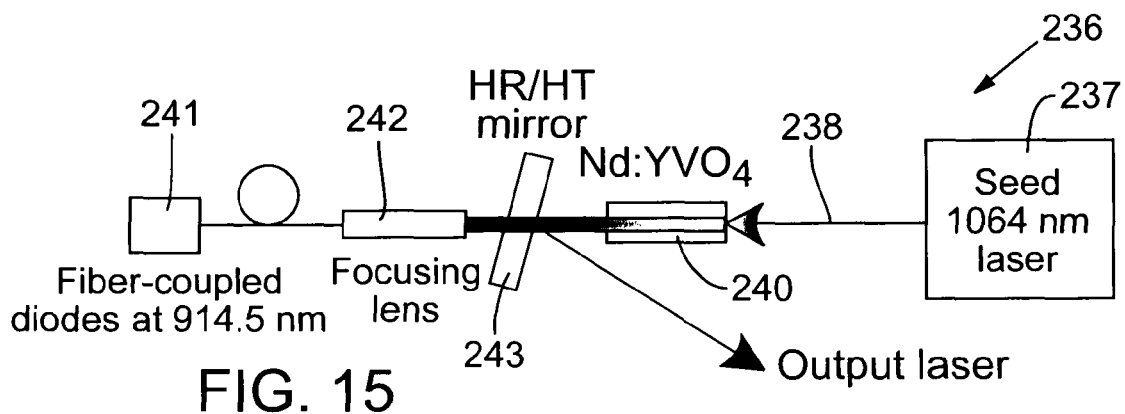
FIG. 15 is a block diagram of a Nd:YVO$_4$ laser power amplifier pumped at 914.5 nm.

FIG. 15 shows a Nd:YVO$_4$ power amplifier 236 optically pumped at 914.5 nm to produce a high-power, high efficiency lasing device at 1064 nm. Power amplifier 236 includes a seed laser 237 emitting a beam 238 of 1064 nm energy that propagates through a Nd:YVO$_4$ crystal 240. Nd:YVO$_4$ crystal 240 is an a-cut, 20 mm long, 3 mm diameter octagonal rod of vanadate crystal, with 2.0% at. doping. The laser mode size is about 600 μm in diameter. A fiber-coupled diode array 241 emits 914.5 nm light that propagates through a focusing lens 242 and a dichroic mirror 243 to optically pump Nd:YVO$_4$ crystal 240. Fiber-coupled diode array 241 may be, for example, an array of fiber-coupled single emitters available from JDS Uniphase of Milpitas, Calif., with full-width, half-maximum (FWHM) bandwidth of 4 nm at 5 W. The fiber core diameter of the JDS Uniphase laser is 100 μm, and the numerical aperture is 0.22.

Figure 16:
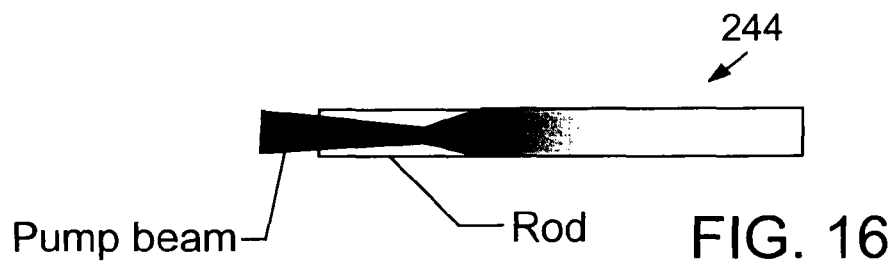
FIG. 16 is a schematic drawing of a preferred 60 mm long vanadate crystal rod designed to exhibit total internal reflection.

With reference to FIG. 16, because the absorption coefficient at 914.5 nm is fairly low, a vanadate bulk material crystal or rod 244 of a typical single-piece length (40 mm-60 mm) is preferred or multiple segments of vanadate crystals to form a long gain medium (40 mm-100 mm). Moreover, the overlap between the pump mode and the laser mode in the center of vanadate crystal rod 244 is threatened by the large divergence angle of the fiber-coupled laser diode output emission. FIG. 16 shows a long vanadate crystal rod structure 244 with total internal reflection (TIR) designed to reduce the loss of the pump power, while the diameter of the circular rod can be matched to the laser mode size (1 mm-3 mm). Currently, such a crystal rod structure, 3 mm diameter×60 mm long, with optical polishing on the end surfaces and barrel, is available from Raicol Crystal, Inc. of Yehud, Israel. Pumping at 914.5 nm with a 2 mm diameter pump beam spot size can provide pump power of as much as a few hundred watts.

Figure 17:
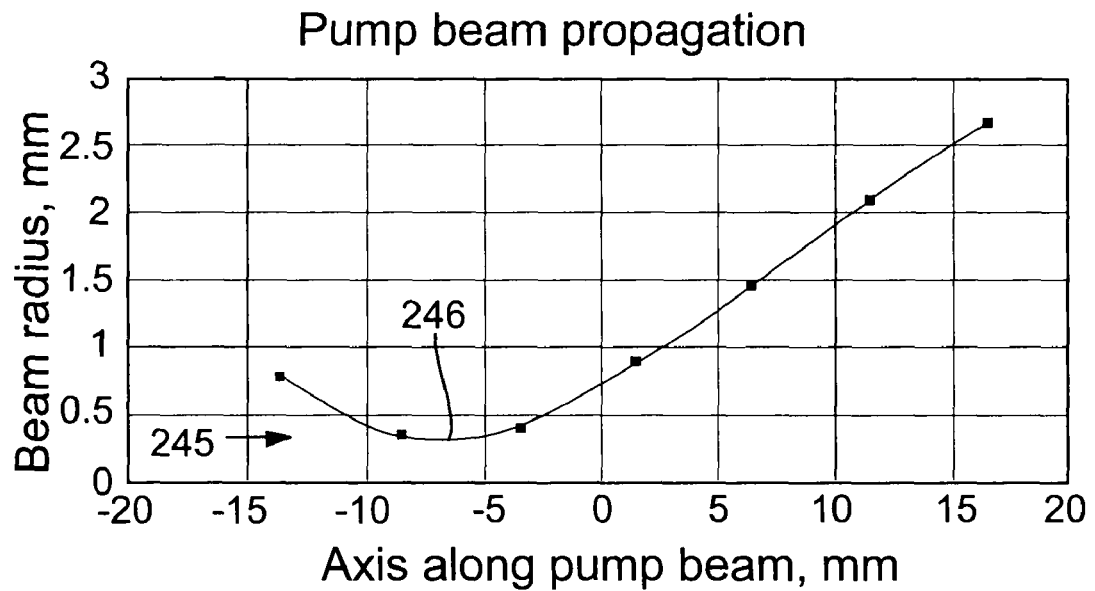
FIG. 17 is a plot showing the change in the pump beam radius as the beam propagates along the length of the crystal rod of FIG. 16. The minimum radius at the −7 mm crystal rod position corresponds to a neck in the beam shown in FIG. 16.

FIG. 17 shows a curve 245 representing the radius of the pump beam as a function of distance along the pump beam axis and indicates a minimum 500 μm pump beam spot diameter 246 for the embodiment described.

The cross section of vanadate crystals can be round, square, or polygonal such as tetragonal, hexagonal, or octagonal. Nd:YVO$_4$ crystal 240 in the form of a rod with an octagonal cross section has the following advantages:

(a) Reduced parasitic oscillations, (known to be problematic in circular cylindrical rods)

(b) More TIR (total internal reflection) surfaces (c) Easy determination of the laser polarization axis (d) A symmetric mode structure, improving final laser beam quality.

Figure 18:
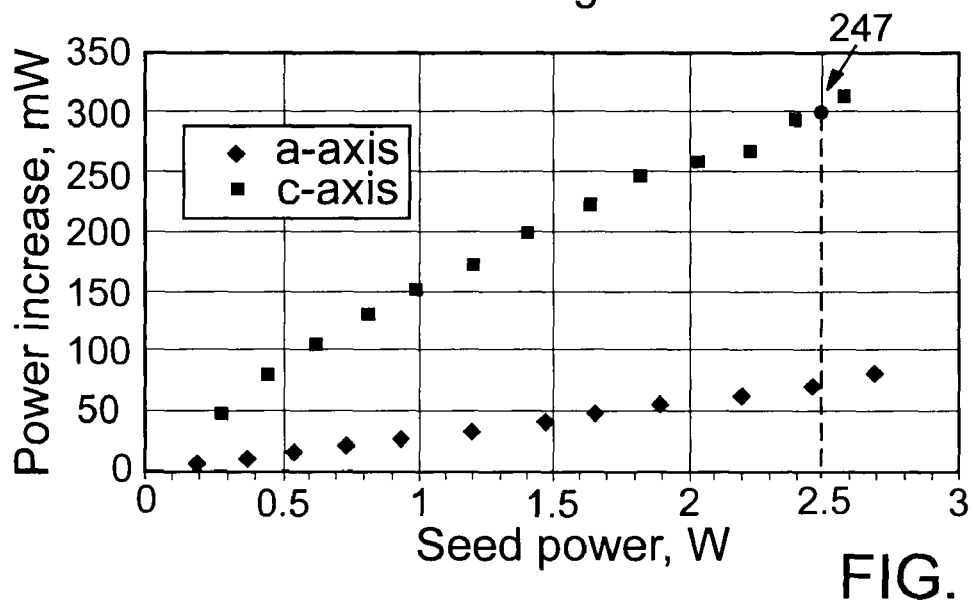
FIG. 18 is a plot showing, for seed polarization along c- and a-crystal lattice axes, power gain as a function of seed power, for a Nd:YVO$_4$ crystal pumped by a 914.5 nm, 3 W diode.
Figure 19:
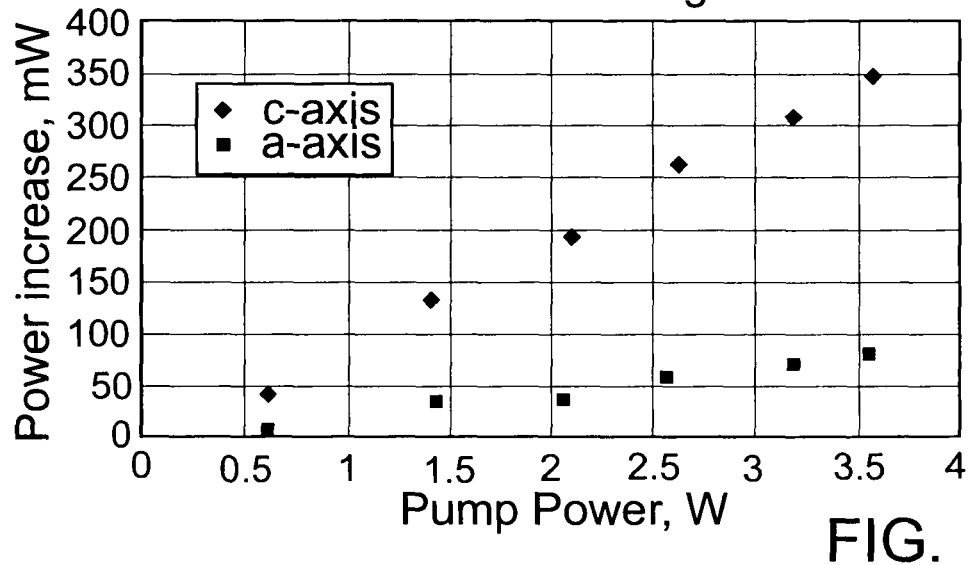
FIG. 19 is a plot showing, for seed polarization along c- and a-crystal lattice axes, power gain as a function of seed power, for a Nd:YVO$_4$ crystal pumped by a 914.5 nm, 2.5 W diode.
Figure 23:
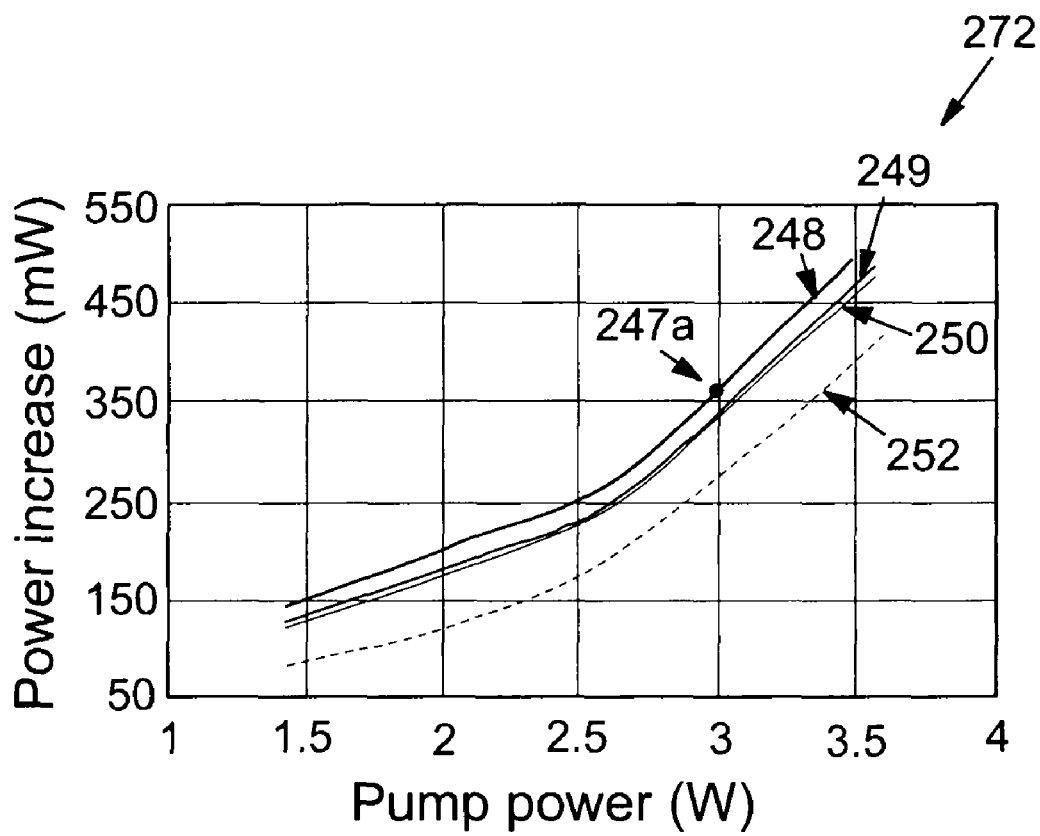
FIG. 23 is a family of curves showing theoretical power increase of the power amplifier of FIG. 15 as a function of pump power for four different pumping wavelengths.

Power amplifier 236 may be configured to facilitate independent power amplification along the a- and c-axes of the vanadate crystal lattice. FIGS. 18 and 19 show power increase as a function of seed laser beam power and pump power, respectively. When vanadate crystal 240 is pumped by a 914.5 nm diode, the seed laser beam power becomes amplified. FIG. 18 shows an experimentally determined 310 mW power increase 247 with 3 W pump power and a 2.5 W seed laser beam at 914.5 nm pump wavelength. FIG. 23 shows a corresponding computer model-predicted power increase curve 248 for a 914.5 nm pump wavelength. Datum point 247a on curve 248 corresponds to datum point 247 of FIG. 18 and represents a computer-model predicted 360 mW power increase with 3 W pump power and a 2.5 W seed laser beam. FIG. 23 also shows power increase curves 249, 250, and 252 of somewhat smaller magnitude predicted for lower pump wavelengths. Power amplifier 236 is capable of achieving a power increase on the order of 10 W during high power operation because a Nd:YVO$_4$ crystal 240 can be constructed to withstand 100 W pump power and the power increase is a linear function of pump power.

Additionally, JDS Uniphase laser diodes operating at 914.5 nm made with InPGaAs are readily available because of their applications in fiber optic communication technology. These devices feature greater than 70% electrical-to-optical efficiency, while typical commercial efficiency for 800 nm-series diodes is less than 50%. Coherent, Inc. of Santa Clara, Calif. is another source of high power fiber-coupled diodes up to 50 W at 914.5 nm, in which the core fiber diameter is 800 μm and the numerical aperture is less than 0.14.

Figure 20:
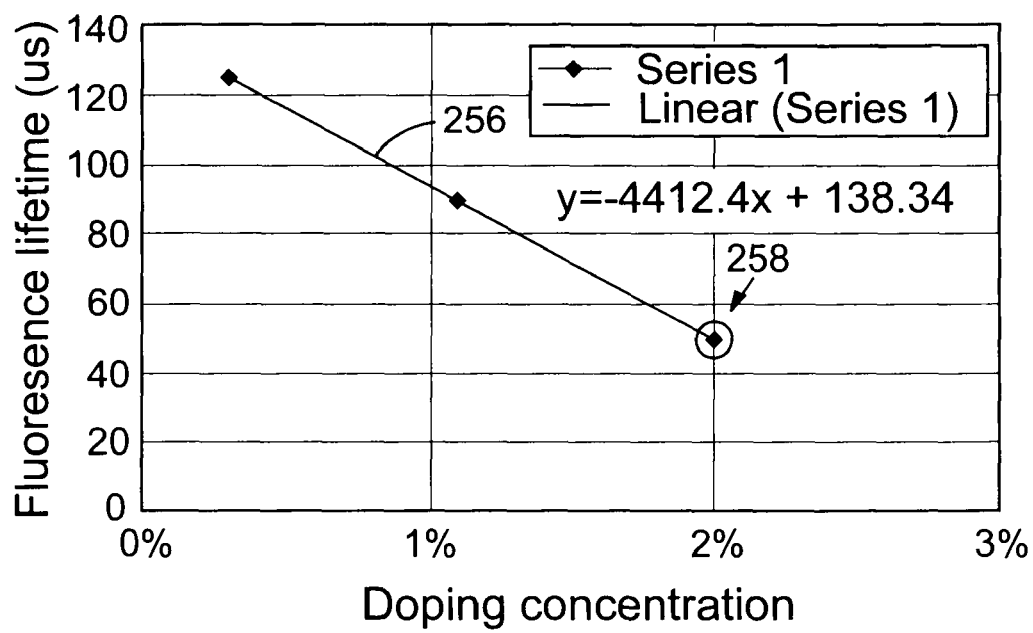
FIG. 20 is a graph showing an inverse linear dependence of fluorescence lifetime on doping concentration at 808 nm pumping.

FIG. 20 shows an inverse linear relationship 256 between fluorescence lifetime and doping concentration. A short fluorescence lifetime achieves short pulse durations corresponding to a high pulse repetition frequency. Independent of pumping wavelength, fluorescence lifetime drops to 50 μs when a 2.0% at. doping concentration is achieved, as indicated by datum point 258.

Figure 21A:
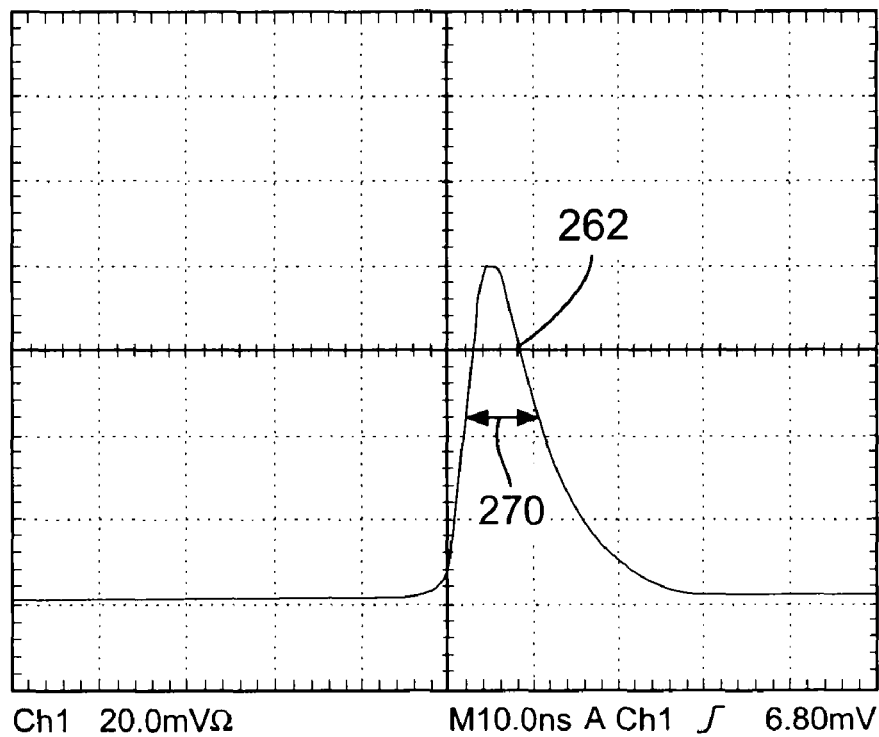
FIGS. 21A and 21B are oscilloscope traces of a laser pulse displayed as a function of time, respectively, before and after amplification using 914.5 nm pumping.
Figure 21B:
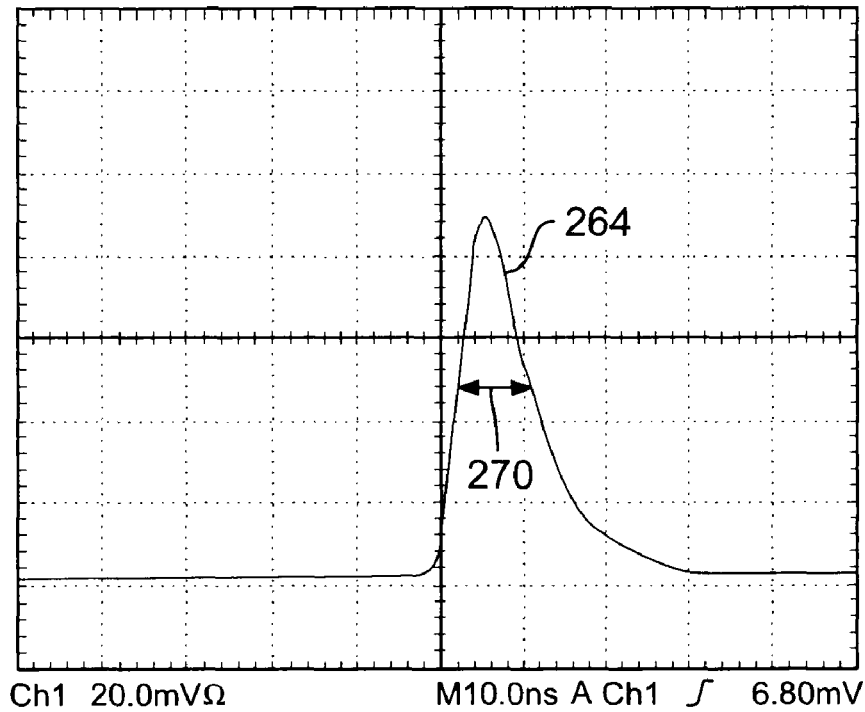
Figure 22:
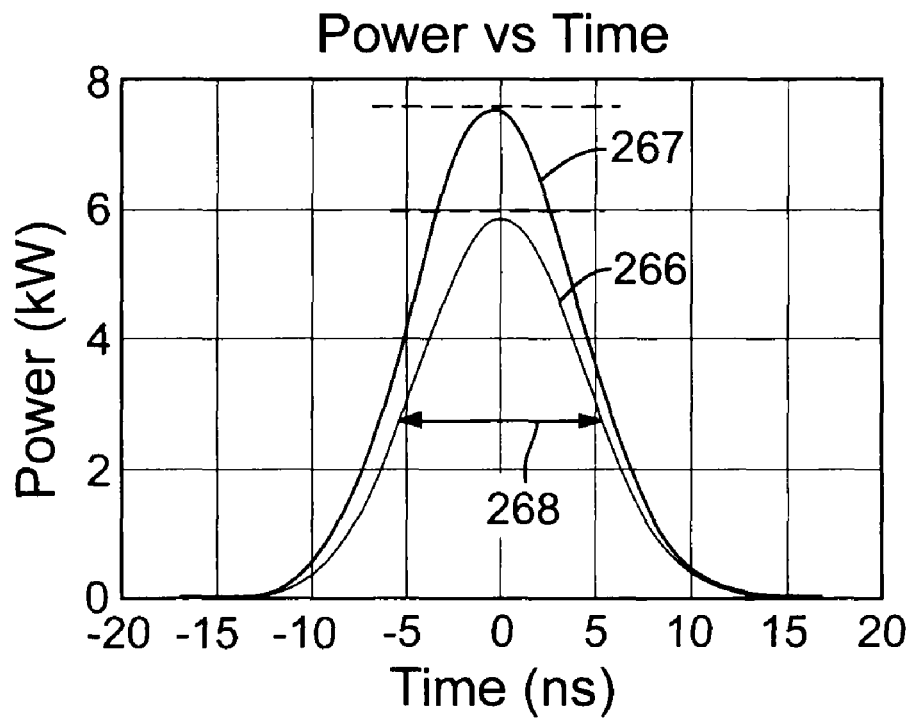
FIG. 22 is a graph of a theoretical temporal pulse before and after amplification, for comparison with experimental results shown in FIGS. 21A and 21B.

Experimental and theoretical 1064 nm temporal pulses propagating from dichroic mirror 243 as laser output of power amplifier 236 of FIG. 15 are shown in FIGS. 21A and 21B and FIG. 22, respectively. A short pulse 262 shown in FIG. 21A and a short pulse 264 shown in FIG. 21B represent power levels measured, respectively, before and after power amplifier 236. With reference to FIG. 22, curves 266 and 267 represent theoretical temporal pulses, respectively, before and after power amplifier 236 and indicate a total duration 268 of about 20 ns, with most of the power concentrated within a very short time interval of 10 ns. During this time, the peak laser output power is amplified from about 6 kW to about 7.5 kW, representing about a 25% power enhancement. Experimental results set forth in FIGS. 21A and 21B, using different parameters from the theoretical model, show temporal pulses of about the same width 270 as that predicted by the theoretical model of FIG. 22, with a power increase, in this case, of 12.5%.

FIG. 23 presents a set of curves 272 representing results of a computer model of power amplifier 236 and gives power increase as a function of pump power at 808 nm, 880 nm, 888 nm, and 914.5 nm pump wavelengths, Specifically, curves 248, 249, 250, and 252 represent, respectively, 914.5 nm, 880 nm, 880 nm, and 808 nm pump power. Computer model curves 272 show that power increases at pumping wavelengths 914.5 nm, 888 nm, and 880 nm are much higher than the power increase at 808 nm, and that power increases obtained by pumping at 888 nm and 880 nm are similar to each other. However, the maximum power increase occurs at 914.5 nm.

Benefits of disclosed parameter adjustments and associated performance improvements are summarized in the table below.

| PARAMETER | CONVENTIONAL ND:YVO$_4$ LASER | DUDLEY ET AL. | MCDONAGH ET AL | PREFERRED EMBODIMENT |
|---|---|---|---|---|
| Pumping wavelength, nm | 808 | 880 | 888 | 914.5 |
| Doping concentration, % at. | 0.25 | 0.5 | 0.5 | 2.0 |
| Pump power limit, W | 60 | 80 | 150 | ≧200 |
| Crystal rod length, mm | 8-15 | >25 | ≧30 | ≧40 |
| RESULT | | | | |
| Power out, W | <30 | 30-40 | 60 | ≧60 |
| Absorption bandwidth, nm | 4 | 2.5 | 3.5 | 3.5 |
| Absorption coefficients c/a | 6/2 | 6.4/1.3 | 1.2/1.1 | 0.5/0.48 |
| Quantum defect level, % (wavelength-dependent) | 24 | 17.3 | 16.5% | 14 |

It will be obvious to those having skill in the art that many changes may be made to the details of the above-described embodiments without departing from the underlying principles of the invention. For example, the vanadate crystal may have laser-active ion doping established by neodymium ion doping in a lutetium host, neodymium ion doping in a yttrium host, or neodymium ion doping in a gadolinium and yttrium mixed host. The scope of the present invention should, therefore, be determined only by the following claims.

The invention claimed is:

1. A method of producing with high efficiency laser output emission at an output wavelength in response to delivery to a lasing medium optical pumping energy at a pump wavelength, comprising:

configuring a lasing medium including a host crystal to produce emission of lasing output energy in response to delivery of optical pumping energy, the host crystal characterized by a laser mode, laser mode size, and polygonal crystal structure with orthogonal crystal lattice axes and doped with laser active ions in an ion doping concentration from about 0.5% at. to about 3.0% at., and the host crystal having a bulk material length set to a value that is sufficient to absorb the optical pumping energy and having a cross sectional area set to a value that is substantially equal to the laser mode size;

delivering to the lasing medium the optical pumping energy at a pump wavelength set to a value that establishes a low quantum defect corresponding to a difference between the optical pumping energy and the lasing output energy at an output wavelength;

the value to which the pump wavelength is set causing the host crystal at the ion doping concentration to exhibit an energy absorption coefficient of less than 2 cm$^{-1}$ and generally symmetric energy absorption along the orthogonal crystal lattice axes of, and a consequent reduction in thermal load in, the polygonal crystal structure; and the value to which the cross sectional area is set suppressing higher order modes to provide the lasing output energy with high quality beam shape.

2. The method of claim 1, in which the ion doping concentration is from about 1.0% at. to about 2% at.

3. The method of claim 1, in which the ion doping concentration is established by neodymium ion doping in at least one of a vanadate, yttrium, gadolinium, and lutetium host.

4. The method of claim 1, in which the value of the pump wavelength is between about 910 nm and about 920 nm.

5. The method of claim 4, in which the output wavelength of emission of lasing output energy is about 1064 nm or about 1342 nm.

6. The method of claim 1, in which the host crystal is vanadate crystal and the bulk material length of the vanadate crystal is greater than 20 mm.

7. The method of claim 1, in which the cross-section of the host crystal is one of round, square, or polygonal shape.

8. The method of claim 1, in which the cross-section of the host crystal is of octagonal shape.

9. The method of claim 1, further comprising delivering to the lasing medium seed laser output energy at the output wavelength so that the lasing output energy is greater than the seed laser output energy.

10. The method of claim 9, in which the seed laser output energy is emitted by a diode-pumped solid-state laser.

11. The method of claim 9, in which the seed laser output energy is emitted by a fiber laser.

12. The method of claim 1, in which the laser output emission propagates from a laser power amplifier.

13. A laser exhibiting high optical efficiency and low quantum defect, comprising:

a laser resonator in which a lasing medium resides, the lasing medium characterized by a laser mode, laser mode size, and polygonal crystal structure with orthogonal crystal lattice axes and doped with laser active ions in an ion doping concentration from about 0.5% at. to about 3.0% at., and the lasing medium having a bulk material length set to a value that is sufficient to absorb optical pumping energy and having a cross sectional area set to a value that is substantially equal to the laser mode size;

a pumping source optically associated with the lasing medium to provide the optical pumping energy to stimulate a lasing gain of the lasing medium and thereby produce emission of lasing output energy at an output wavelength, the pumping source operating at a pump wavelength set to a value that causes the lasing medium to exhibit an energy absorption coefficient of less than 2 cm$^{-1}$ and generally symmetric energy absorption along the orthogonal crystal lattice axes of, and a consequent reduction in thermal load in, the polygonal crystal structure, and the value to which the cross sectional area is set suppressing higher order modes to provide the lasing output energy with high quality beam shape; and an output coupler optically associated with the laser resonator to couple out of the laser resonator the lasing output energy.

14. The laser of claim 13, further comprising a seed laser emitting seed laser output energy at the output wavelength, the seed laser output energy coupled to the lasing medium to provide a power amplifier from which propagates an amount of lasing output energy that is greater than the seed laser output energy.

15. The laser of claim 14, in which the seed laser output energy is emitted by a diode-pumped solid-state laser.

16. The laser of claim 14, in which the seed laser output energy is emitted by a fiber laser.

17. The laser of claim 14, in which the seed laser output energy is emitted by a semiconductor laser.

18. The laser of claim 13, in which the output wavelength of emission of lasing output energy is about 1064 nm or about 1342 nm.

* * * * *